United States Patent
Fujii et al.

(10) Patent No.: US 7,885,997 B2
(45) Date of Patent: Feb. 8, 2011

(54) DATA PROCESSING METHOD, PROGRAM, DEVICE, MESSAGE STRUCTURE, MESSAGE GENERATION METHOD, AND MESSAGE TRANSMISSION METHOD

(75) Inventors: Kenichi Fujii, Yokohama (JP); Masaki Shitano, Yokohama (JP); Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 11/517,340

(22) Filed: Sep. 8, 2006

(65) Prior Publication Data

US 2007/0002739 A1 Jan. 4, 2007

Related U.S. Application Data

(63) Continuation of application No. PCT/JP2005/002605, filed on Feb. 18, 2005.

(30) Foreign Application Priority Data

Mar. 16, 2004 (JP) ............................. 2004-074536

(51) Int. Cl.
*H04L 12/26* (2006.01)
(52) U.S. Cl. ................. 709/203; 709/201; 709/246; 709/248; 717/144; 717/148
(58) Field of Classification Search ................ 709/203, 709/246, 201; 715/700–866; 717/140–148, 717/106–108, 114–137
See application file for complete search history.

(56) References Cited

U.S. PATENT DOCUMENTS

| | | | |
|---|---|---|---|
| 5,157,467 A | 10/1992 | Fujii | 357/16 |
| 5,311,011 A | 5/1994 | Shimizu et al. | 250/214.1 |
| 6,339,783 B1 | 1/2002 | Horikiri | 709/203 |
| 6,587,126 B1 | 7/2003 | Wakai et al. | 345/744 |
| 6,947,156 B1 | 9/2005 | Jeyachandran et al. | 358/1.15 |

(Continued)

FOREIGN PATENT DOCUMENTS

CN 1443013 A 9/2003

(Continued)

OTHER PUBLICATIONS

European Search Report for corresponding European Patent Application No. 05719275 dated Nov. 27, 2009.

(Continued)

*Primary Examiner*—Wing F Chan
*Assistant Examiner*—Ruolei Zong
(74) *Attorney, Agent, or Firm*—Fitzpatrick, Cella, Harper & Scinto (57) ABSTRACT

If a program is to be transmitted/received by message transmission/reception using SOAP, the program description part goes out of the framework of XML, and the message contents contain an uninterpretable part. A SOAP message (M1) includes a data part (D1), a virtual service part (R1) indicating specifications to process the data part (D1), and a program part (P1). A server (S1) processes the data part (D1) by the specifications indicated by the virtual service part (R1) if the virtual service part (R1) in the SOAP message (M1) indicates the specification of processing to be executed by the instruction executed when executing the instruction contained in the program part (P1) of the SOAP message (M1).

17 Claims, 8 Drawing Sheets

U.S. PATENT DOCUMENTS

| | | |
|---|---|---|
| 7,426,721 B1 * | 9/2008 | Saulpaugh et al. .......... 717/144 |
| 2002/0082002 A1 | 6/2002 | Fujii .......................... 455/419 |
| 2002/0124113 A1 | 9/2002 | Gargya et al. ............... 709/246 |
| 2003/0005181 A1 | 1/2003 | Bau, III et al. |
| 2003/0074401 A1 | 4/2003 | Connell et al. ............. 709/203 |
| 2003/0074472 A1 | 4/2003 | Lucco et al. ................ 709/245 |
| 2003/0074482 A1 | 4/2003 | Christensen et al. ........ 709/313 |
| 2003/0093436 A1 | 5/2003 | Brown et al. |
| 2004/0111533 A1 * | 6/2004 | Beisiegel et al. ............ 709/246 |
| 2005/0015707 A1 | 1/2005 | Ji et al. ...................... 715/500 |
| 2005/0080930 A1 * | 4/2005 | Joseph ....................... 709/248 |
| 2005/0254531 A1 | 11/2005 | Furukawa et al. ............ 372/22 |
| 2005/0265419 A1 | 12/2005 | Fujii et al. ................... 372/96 |
| 2006/0025071 A1 | 2/2006 | Yamazaki et al. .......... 455/3.06 |
| 2007/0002739 A1 | 1/2007 | Fujii et al. .................. 370/230 |

FOREIGN PATENT DOCUMENTS

| | | |
|---|---|---|
| JP | 10-171701 | 6/1998 |
| JP | 10-304417 A | 11/1998 |
| JP | 2000-250735 | 9/2000 |
| JP | 2003-157178 | 5/2003 |
| JP | 2003-223376 | 8/2003 |
| JP | 2004-007452 | 1/2004 |
| JP | 2004-530194 | 9/2004 |

OTHER PUBLICATIONS

Wada, Shu, Research! Web Service Transaction, Java World, Japan, Mar. 1, 2003, vol. 7, No. 3, pp. 62-67.

Yoshida, et al., Service Integration Platform Σ Serv, NTT Gijutsu Journal, Japan, Jul. 1, 2003, vol. 15, No. 7, pp. 46-49.

* cited by examiner

DATA PROCESSING METHOD, PROGRAM, DEVICE, MESSAGE STRUCTURE, MESSAGE GENERATION METHOD, AND MESSAGE TRANSMISSION METHOD

This application is a continuation application of International Application No. PCT/JP2005/002605, filed Feb. 18, 2005, which claims priority from Japanese Patent Application No. 2004-074536 filed on Mar. 16, 2004, the entire contents of each of which are incorporated by reference herein.

TECHNICAL FIELD

The present invention relates to a data processing method, program, device, message structure, message generation method, and message transmission method.

BACKGROUND ART

Figure 1:
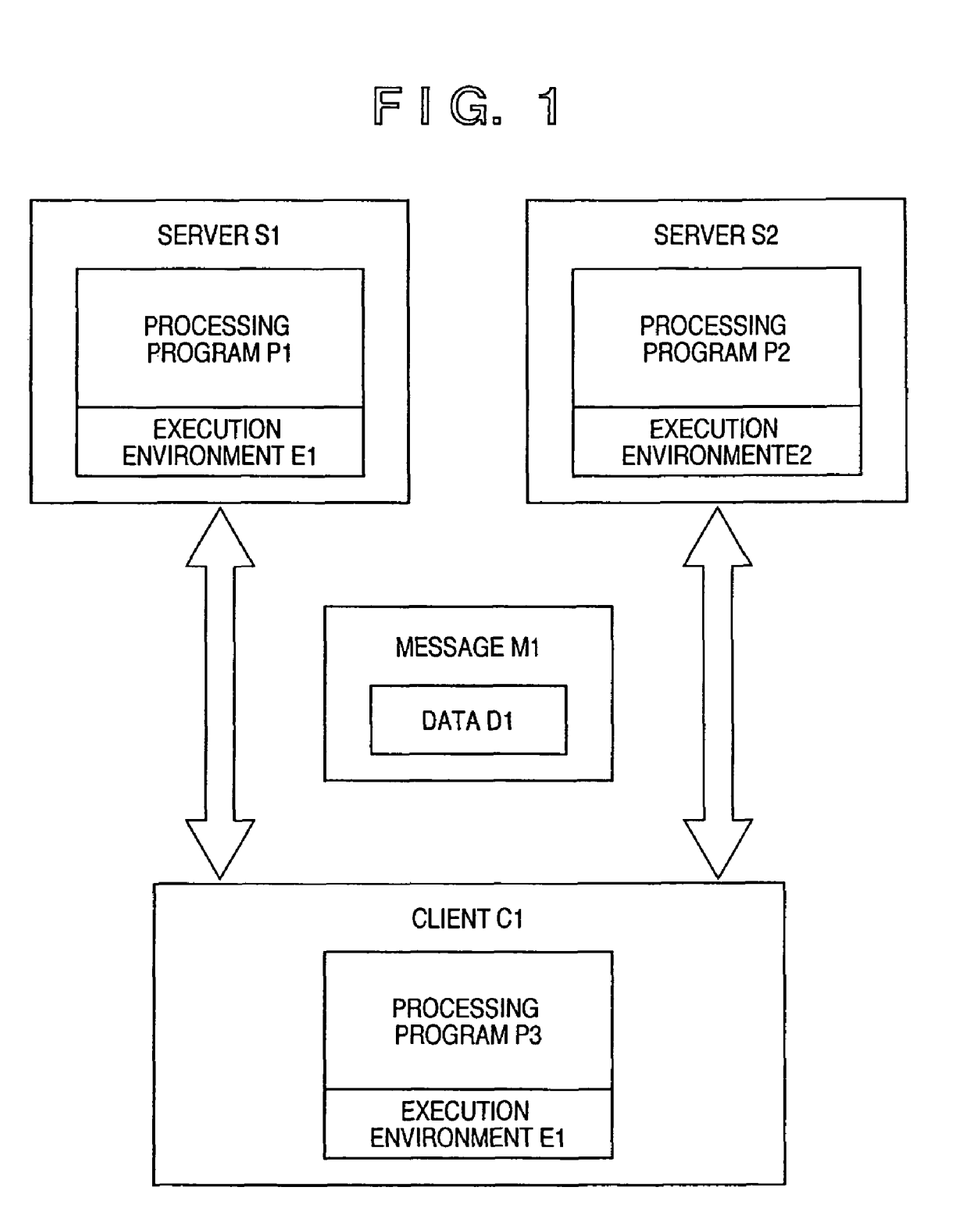
FIG. 1 is a view showing distributed processing between computers according to a prior art.

FIG. 1 is a view showing the outline of distributed processing using a message in a client-server system according to a prior art.

Servers S1 and S2 and a client C1 have processing programs P1, P2, and P3, respectively. The client C1 and servers S1 and S2 execute distributed processing by transmitting/receiving a message M1 containing only data D1 to be processed by the processing programs.

Distributed processing is executed on the basis of messages. The message M1 transmitted/received contains only data. Hence, even when the servers S1 and S2 run in different execution environments using different computer languages, operating systems, or server software programs, the client C1 and the server S1 or S2 can use the same message M1. In FIG. 1, nodes having two different execution environments E1 and E2 are present in the client and servers.

To transmit/receive a message containing not only data but also a program in this system, the server side and client side must have the same execution environment and, more particularly, the same program processing environment due to the following reason. That is, data interpretation is possible under any programming language/computer environment though program execution requires an execution environment depending on the computer language describing that program. Hence, the distributed processing technique based on message exchange enables program transmission/reception at the expense of common processing under different environments.

A prior art about distributed processing is disclosed in, e.g., Japanese Patent Laid-Open No. 2003-157178 (patent reference 1). This prior art aims at facilitating cooperation with an Internet environment by XML-converting parameters (data) in invoking processing in a client and a server. The technique however XML-converts only the parameters of a request and cannot solve the problem that the transmitting and receiving sides must eventually have the same environment to execute an object containing both data and a program.

To solve this problem, a common execution environment may be formed by laying a virtual execution environment (virtual machine: VM) over the execution environments. However, this method only facilitates ensuring the same execution environment. Since a computer language itself uses a conventional notation, mismatch occurs actually between the description scheme of data and that of a program in a message (to be described in the following section).

A Web service technology is a distributed processing construction method in a computer. In the Web service technology, a message is described in an extensible markup language, i.e., XML. XML is established by the WWW consortium (W3C) 1998 for the purpose of utilization of structured documents on the Internet. The specifications of XML can be referred to in the website at w3.org in the subdirectory "XML". The specifications of a message described in XML are called SOAP (Simple Object Access Protocol) in the Web service technology. SOAP defines message description specifications, i.e., a type of data and a method of expressing that data. When SOAP in the Web service technology is used, the distributed processing shown in FIG. 1 can easily be implemented. The WWW consortium (W3C) has also released the specifications of SOAP, like XML, which can be referred to in the website at w3.org in the subdirectory "SOAP" of subdirectory "TR".

Message transmission/reception using the Web service technology fundamentally uses SOAP described in XML. SOAP using XML can handle a message as a structured document. That is, SOAP can regard a message as a document and freely process its arbitrary part.

DISCLOSURE OF INVENTION

Problems that the Invention is to Solve

In message transmission/reception using SOAP, it is very important to maintain the framework of XML documents as a message format. However, if a program is transmitted/received in the mechanism of SOAP by sharing the above-described virtual execution environment, only the program description part goes out of the framework of XML.

This is because the program itself must use a conventional notation without particularly considering affinity to XML. This produces a situation where message contents contain an uninterpretable part in each node using the Web service technology that is particularly built on the assumption of distribution of SOAP or XML documents. Hence, the advantage of SOAP, i.e., messaging using XML with, e.g., partial encryption or signature is lost.

Additionally, the system that creates a virtual environment to operate a program is essentially relatively bulky and requires plentiful computer resources because the virtual environment must assume execution of all programs describable in the computer language. That is, the overhead produced by the necessity of building a multiple computer environment different from the original computer environment is nonnegligible.

Many languages to cover a description of full-scale processing employ a compiler scheme. In this case, load of compilation processing must be paid at the time of execution. If a compiled object is transmitted by a binary scheme, it is impossible to confirm the execution contents before execution.

Means of Solving the Problems

In order to solve the above-described problems, according to the present invention, there are provided a data processing method, data processing program, and data processing device, characterized in that a message is received that includes a data part, a specification part indicating specifications to process the data part, and a program part containing an instruction to execute processing with the specifications indicated by the specification part, the specification part indicating the specifications of processing to be executed by the instruction executed when executing the instruction contained in the program part of the received message is decided, and the data part is processed by the specifications indicated by the specification part in the message, which is decided to indicate the specifications of processing to be executed by the executed instruction.

According to the present invention, there is also provided a message structure including a data part, a specification part indicating specifications to process the data part, and a program part, characterized in that the program part contains an instruction indicating to process the data part by the specifications indicated by the specification part in the message.

According to the present invention, a message includes a data part, specification part, and program part. The specification part in the message defines the specifications of processing to be executed by the program part. Hence, a program and necessary data can be described in the range of the framework to describe the message.

According to the present invention, a program can be executed by a few computer resources. Other features and advantages of the present invention will be apparent from the following descriptions taken in conjunction with the accompanying drawings, in which like reference characters designate the same or similar parts throughout the figures thereof.

DESCRIPTION OF REFERENCE SYMBOLS

P1 program part
R1 virtual service part
D1 data part
P2 SOAP processing program
P4 virtual service processing program
P5 service cooperative processing program

BEST MODE FOR CARRYING OUT THE INVENTION

An embodiment of the present invention will be described below in detail with reference to the accompanying drawings. Detailed examples of processing will also be described below, though the present invention is not limited to them.

Figure 2:
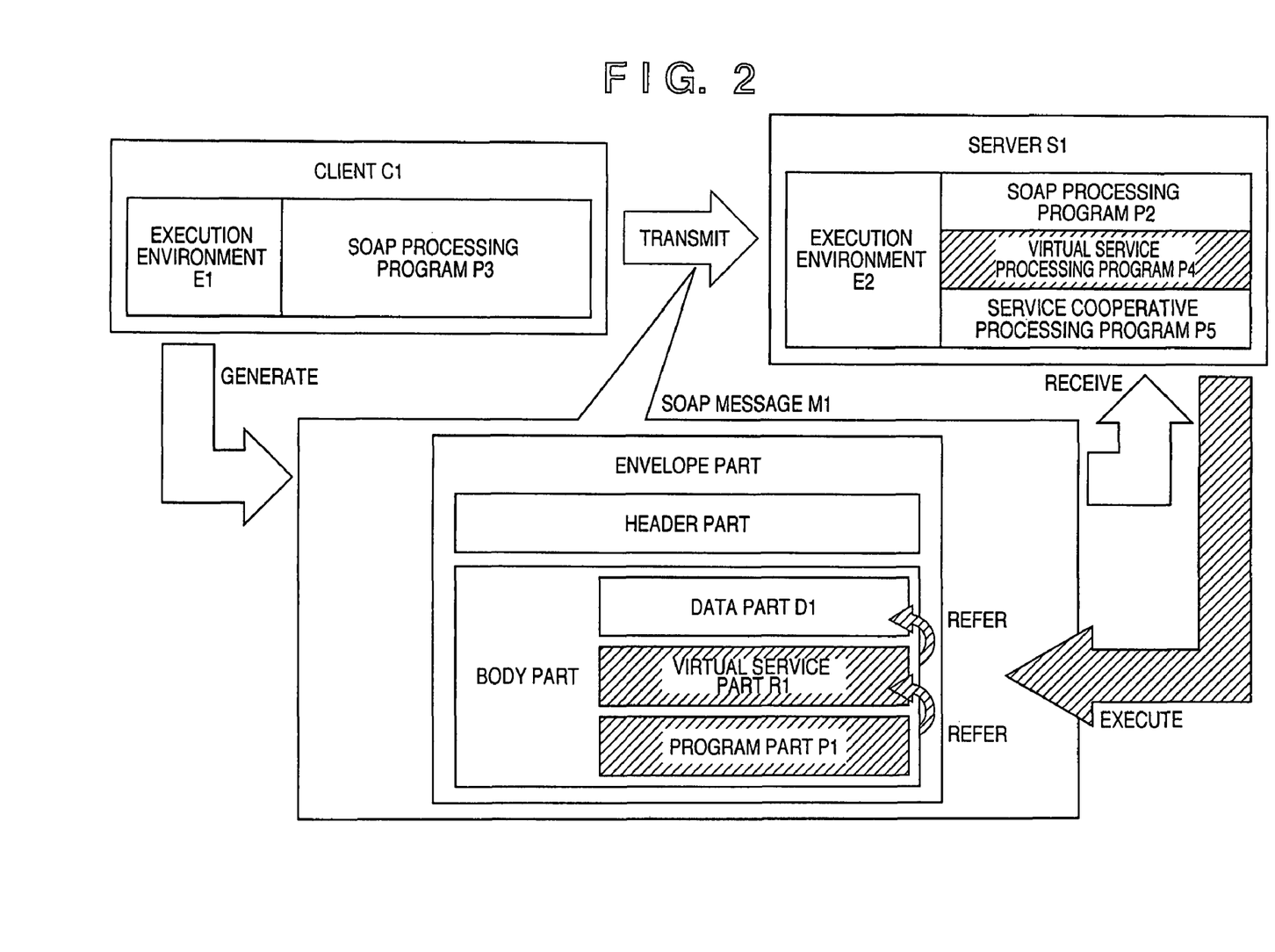
FIG. 2 is a view showing the outline of message processing according to an embodiment of the present invention.

FIG. 2 is a view showing the outline of message transmission/reception according to this embodiment. The outline of a SOAP message will be described first. A SOAP message M1 includes an envelope part, header part, and body part. The envelope part and header part have the same contents as in a prior art and require no change of an existing processing system to process SOAP. In this embodiment, the body part stores a virtual service part R1 and a program part P1 in addition to a data part D1 that is stored in normal SOAP.

A client C1 decides processing to be executed by an external processing system (server S1) and causes a SOAP processing program P3 to generate the SOAP message M1. At this time, not only the data D1 but also the program P1 indicating how to process the data D1 is stored. The program P1 is described by a service cooperative description language, i.e., a computer language with high affinity to the SOAP message M1 using XML. This will be described later in detail.

The client C1 transmits the message M1 to the server S1. If the message is a normal SOAP message, the server S1 causes a SOAP processing program P2 to process it. If the message is a SOAP message containing the program P1, processing shifts to a virtual service processing program P4. The virtual service processing program P4 links the program part P1 to the data D1 to be processed through the virtual service part R1. A service cooperative processing program P5 executes the program P1. Then, the server S1 returns the execution result to the client C1.

Figure 3:
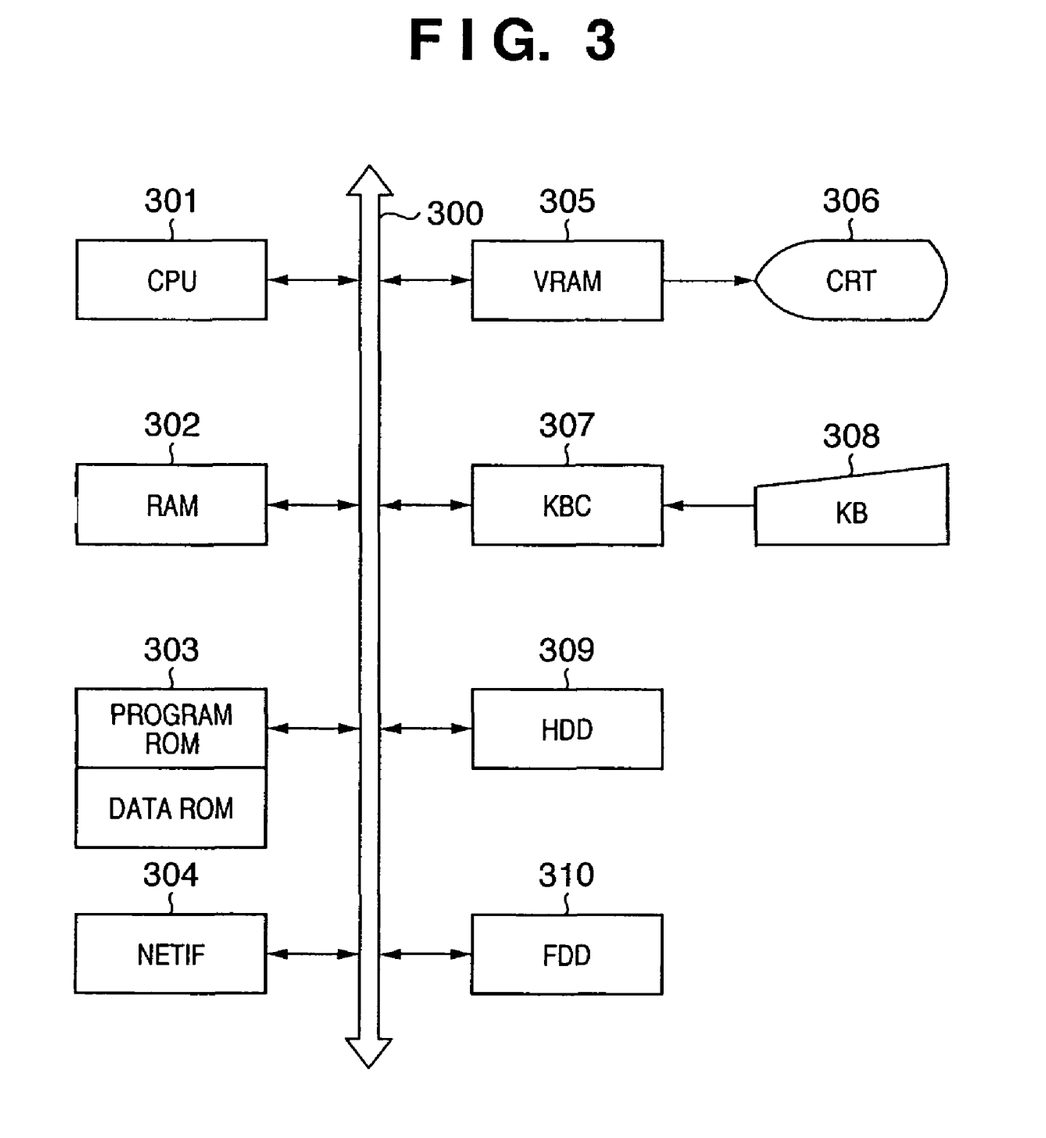
FIG. 3 is a block diagram showing a computer system such as a PC (Personal Computer) included in a client or server according to the embodiment of the present invention.

FIG. 3 is a block diagram showing a computer system such as a PC (Personal Computer) included in the client C1 or server S1 according to this embodiment.

Referring to FIG. 3, a central processing unit (to be referred to as a CPU hereinafter) 301 controls the computer system.

A random access memory (to be referred to as a RAM hereinafter) 302 functions as the main memory of the CPU 301, the area of an execution program, the execution area of the program, and a data area.

A read only memory (to be referred to as a ROM hereinafter) 303 records the operation processing procedures of the CPU 301. The ROM 303 includes a program ROM that records basic software (operating system: OS) serving as a system program to control the computer system and a data ROM that records information necessary for the operation of the system. An HDD 309 (to be described later) may be used in place of the ROM 303. The SOAP processing program P3 of the client C1 in FIG. 2 is recorded in the ROM 303 or HDD 309 of the client C1. The SOAP processing program P2, virtual service processing program P4, and service cooperative processing program P5 of the server S1 are recorded in the ROM 303 or HDD 309 of the server S1.

A network interface (to be referred to as an NETIF hereinafter) 304 controls data transfer to/from another computer system through a network or diagnoses the linkage state. The client C1 in FIG. 2 causes the NETIF 304 of the client C1 to transmit the SOAP message M1 to the server S1. The server S1 in FIG. 2 causes the NETIF 304 of the server S1 to receive the SOAP message M1. The server S1 in FIG. 2 stores the received SOAP message M1 in the RAM 302.

A video RAM (to be referred to as a VRAM hereinafter) 305 bitmaps an image to be displayed on the screen of a CRT 306 to display the operation state of the computer system and controls display of the image. The display device (to be referred to as a CRT hereinafter) 306 includes, e.g., a display. A controller 307 controls an input signal from an external input device 308 (to be described later).

The external input device 308 receives an operation executed for the computer system by the user of it and includes, e.g., a keyboard.

The storage device 309 is used to store data such as image information and includes, e.g., a hard disk.

An external input/output device 310 such as a Floppy® disk drive or CD-ROM drive loads/unloads a removable disk and is used to, e.g., read out the above-described application programs from a medium. The external input/output device 310 will be referred to as an FDD hereinafter.

The application programs and data stored in the HDD 309 may be stored in the FDD 310. An input/output bus (address bus, data bus, and control bus) 300 links the above-described blocks.

Figure 4A:
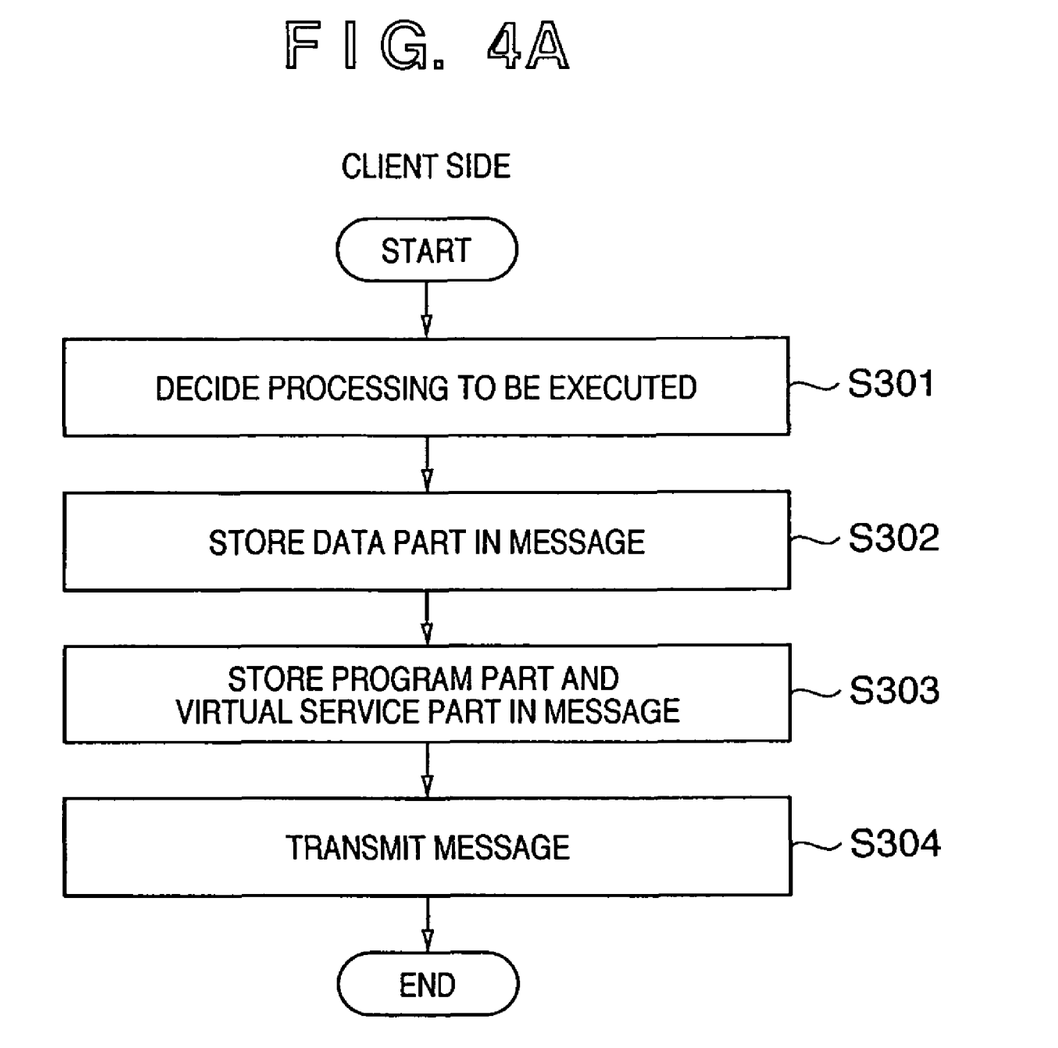
FIGS. 4A and 4B are flowcharts showing the outline of processing according to the embodiment of the present invention.
Figure 4B:
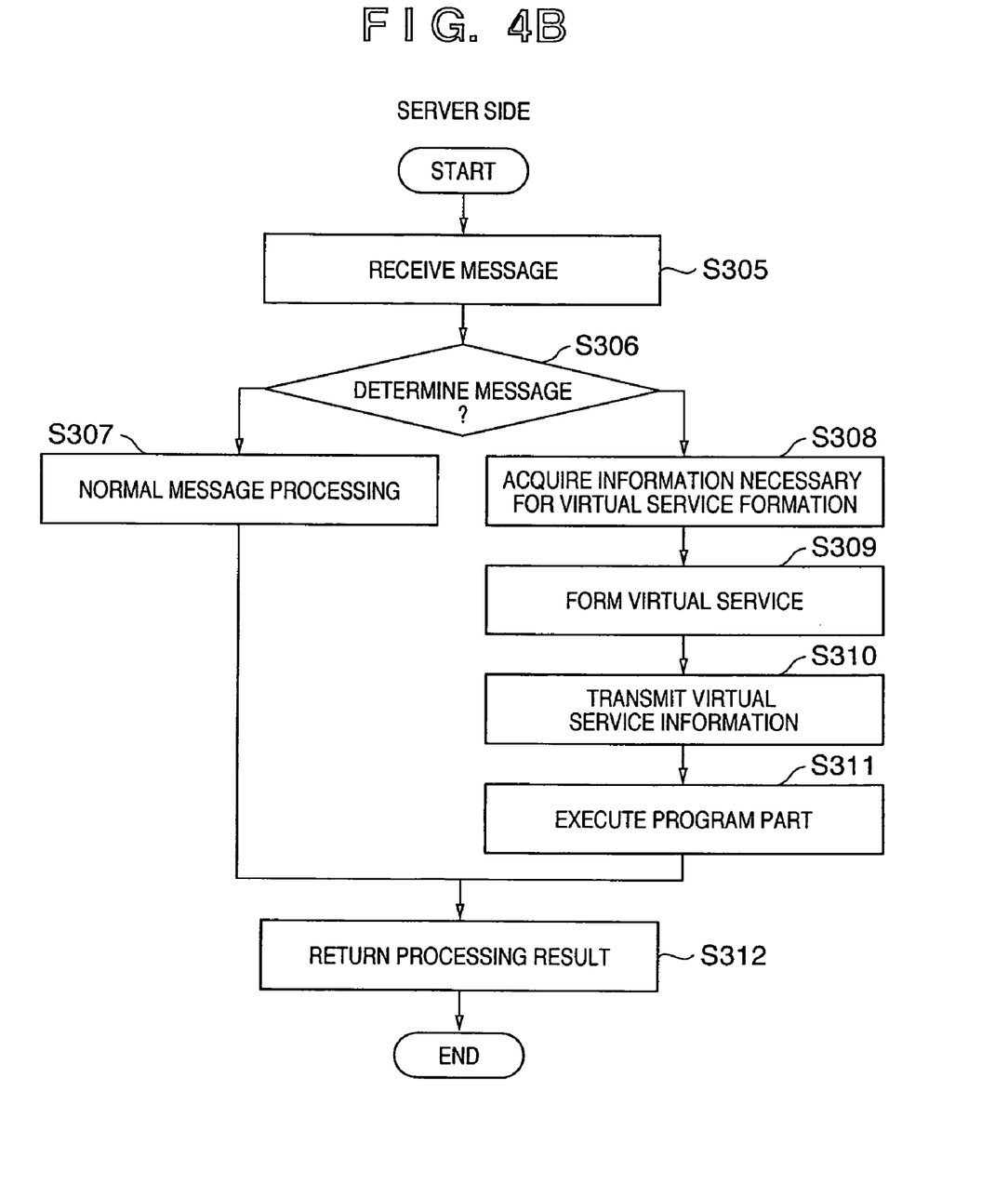

FIGS. 4A and 4B are flowcharts showing the processing steps of the client C1 and server S1. FIG. 4A shows part of a program installed in the client C1. FIG. 4B shows part of a program installed in the server S1. The CPU 301 of the client C1 reads out the program from the ROM 303 or HDD 309 and executes the operation shown in FIG. 4A. The CPU 301 of the server S1 reads out the program from the ROM 303 or HDD 309 and executes the operation shown in FIG. 4B.

In step S301 of FIG. 4A, the client C1 decides processing to be executed by the external processing system (server S1). This processing is decided on the basis of, e.g., the input from the external input device 308.

The SOAP processing program P3 generates the SOAP message M1. More specifically, in step S302, the data D1 is stored in the body part of the SOAP message M1. In step S303, the virtual service part R1 and program P1 indicating how to process the data D1 are generated and stored in the body part of the SOAP message M1. The processing in step S303 will be described later in more detail. The virtual service part R1 is a specification part indicating specifications to process the data D1.

In step S304, the client C1 causes the NETIF 304 to transmit the step message M1 to the server S1, In step S305 of FIG. 4B, the server S1 causes the SOAP processing program P2 to receive the message. More specifically, the SOAP processing program P2 processes the message M1 received by the NETIF 304 of the server S1.

In step S306, it is determined whether the message is a normal SOAP message. If the message is a normal SOAP message, the normal SOAP processing program P2 processes it in step S307.

If it is determined in step S306 that the program part P1 is contained, processing shifts to the virtual service processing program P4. In step S308, the virtual service processing program P4 acquires information necessary for forming a virtual service from the information of the virtual service part R1 stored in the message M1. In step S309, the virtual service processing program P4 forms a virtual service to link the program part P1 to the data D1 to be processed. In step S310, the information is sent to the service cooperative processing program P5. In step S311, the service cooperative processing program P5 executes the program P1. In step S312, the server S1 returns the execution result to the client C1. The processing in step S309 will be described later in more detail.

A service cooperative description language employed as the description language of the program P1 in generating the SOAP message M1 in the client C1 according to the embodiment will be described below. In this embodiment, the service cooperative description language indicates a cooperative description language used for service cooperation in the Web service technology. This technique is used in the Web service technology to describe sequentially invoking functions on a side to provide a plurality of services or executing specific larger processing while doing conditional branching in a processing result. Detailed techniques are BPEL4WS and WSCI.

BPEL4WS is short for Business Process Execution Language for Web Services (BPEL4WS). BPEL4WS is a service cooperative description language defined as the standard for a description of composite services for cooperation of a plurality of services. The specifications are managed by the OASIS Web Services Business Process Execution Language TC of OASIS (at the website oasis-open.org). When BPEL4WS is used, a complex process can be created by creating and combining various activities such as execution of Web service invocation, data manipulation, fault notification, and process termination. These activities can nest in a structured activity that defines their execution method (e.g., whether to execute the activities in order, in parallel, or on the basis of a specific condition).

WSCI is short for Web Service Choreography Interface. WSCI is also a service cooperative description language for a description of cooperation of composite services. The specifications are managed by the WWW consortium (W3C) and can be referred to in the website at w3.org in the subdirectory "wsci" of subdirectory "TR".

As a characteristic feature, these service cooperative description languages are described in XML and have no problem in storing a conventional computer language in a SOAP message as compared to a prior art that uses a virtual computer environment. That is, the advantage of XML, i.e., partial processibility can be prevented from disappearing, unlike in storing a conventional language in a SOAP message as an XML document. In addition, even when a program is stored, the state of the XML document processible throughout the message can be maintained. Hence, the compatibility with a conventional normal SOAP message is very high, and no new processing program need be added to a node to execute intermediate processing such as message transfer.

However, the service cooperative description languages mainly aim at making the functions of nodes to provide services in the Web service technology cooperate with each other but not at manipulating data stored in the SOAP message. That is, the service cooperative description languages normally have only a capability of approaching a server (service providing node) using the Web service technology but no capability of approaching data stored in a specific SOAP message. It is therefore difficult to use them as a computer language to describe processing for data stored in a SOAP message.

In this embodiment, to refer to data stored in a SOAP message without modifying the specifications of the service cooperative description languages and the processing system, the virtual service part R1 is provided in the message M1, and the virtual service processing program P4 is provided in the server part S1. With this arrangement, the service cooperative description languages need not be expanded, and implementation of the processing system of the conventionally existing service cooperative description languages need not support the expanded specifications.

The detailed functions and processing of the virtual service part R1 in the message M1 and the virtual service processing program P4 in the server S1 according to this embodiment will be described below. As described above, a service cooperative description language processes only a service in the Web service technology and has no function of referring to or manipulating data stored in a SOAP message. In this embodiment, a virtual service providing part of a Web service applicable only during SOAP message processing is given to the service cooperative description language execution processing part (P5), thereby implementing a mechanism that converts processing into reference or manipulation of data stored in the SOAP message in fact by causing the service cooperative description language processing part (P5) to execute processing for the Web service as usual. In this embodiment, hence, data in a SOAP message can be referred to or manipulated without modifying the specification of the service cooperative description language and the processing system.

More specifically, a virtual service description to refer to the data part D1 stored upon forming the SOAP message M1 in FIG. 2 is stored as the virtual service part R1 so that the virtual service processing program P4 in the server S1 can process the relationship between the program part P1 and the data part D1. The virtual service processing program P4 forms a virtual Web service providing part on the basis of these pieces of information. This service providing part is given to the service cooperative processing program P5. The service cooperative processing program P5 executes the same processing as normal service cooperative processing so that the data D1 is actually manipulated through the virtual service processing program P4. The virtual service part R1 is a specification part indicating specifications to process the data part D1.

Figure 5:
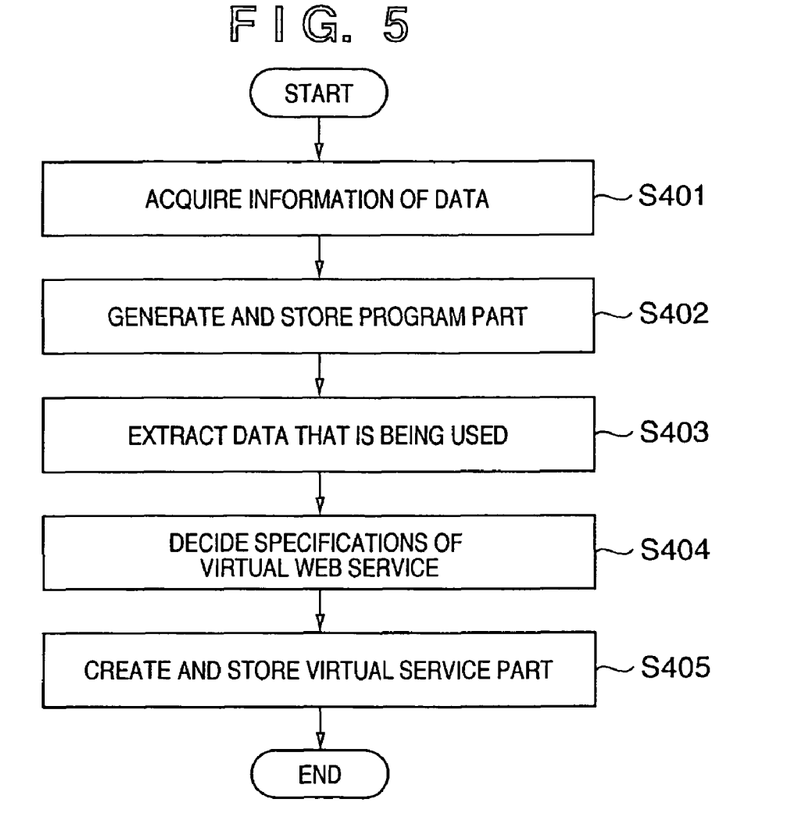
FIG. 5 is a flowchart showing details of processing according to the embodiment of the present invention.

FIG. 5 is a flowchart showing details of the processing in step S303 (FIG. 4A) executed by the SOAP processing program P3 so as to explain the above processing. In step S401, the data D1 stored in the RAM 302 in step S302 is acquired. In step S402, the processing program P1 based on the contents decided in step S301 is generated and stored in the body part of the message M1. The program P1 generated at this time is described in a service cooperative description language processible by the service cooperative processing program P5 in FIG. 2. In step S403, of the data D1, data that is being used (referred or manipulated) by the program P1 generated in step S402 is extracted. In step S404, the specifications of a virtual Web service having a function of converting these data are obtained. In step S405, the virtual Web service is created as the virtual service part R1 in FIG. 2 and stored in the body part of the message M1.

A prior art of dynamically generating a program and storing a message in it is disclosed in, e.g., Japanese Patent Laid-Open No. 2003-223376. In this prior art, an application programming model constructs message contents, and a code generator automatically generates an individual program to process a protocol between a client and a server. This technique aims at automatically generating a program to process only a protocol serving as a message transfer part. Unlike this technique, program generation in step S402 of this embodiment allows describing the message content processing method in a computer language.

Figure 6:
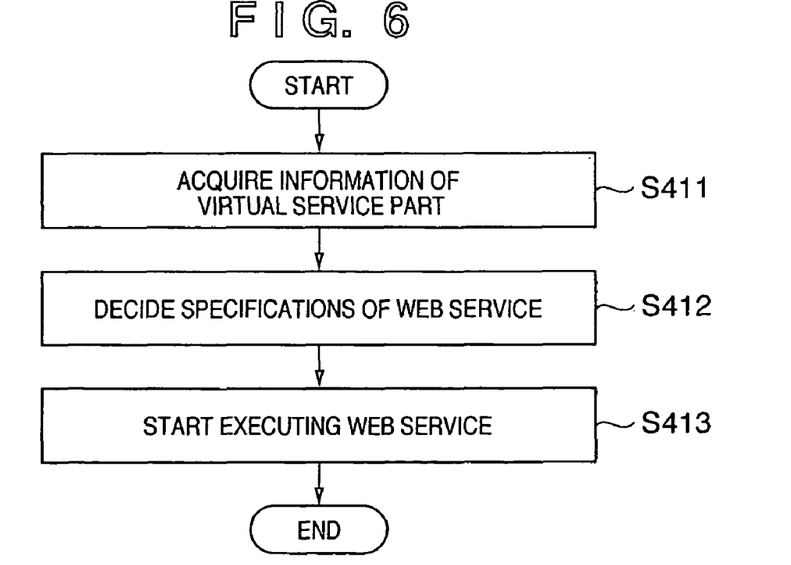
FIG. 6 is a flowchart showing details of processing according to the embodiment of the present invention.

FIG. 6 is a flowchart showing details of the processing in step S309 (FIG. 4B) executed by the virtual service processing program P4 so as to explain the above processing. The virtual service processing program P4 acquires the information of the virtual service part R1 stored in the message M1 in step S308 and receives the information in step S411. In step S412, the virtual service processing program P4 decides the specifications of a Web service providing function to be virtually generated from the virtual service part R1. In step S413, the virtual service processing program P4 constructs the actual function to be provided by the virtual service and starts executing the Web service. With this processing, the program part P1 and the data D1 to be processed can be linked. The information is sent to the service cooperative processing program P5 in step S310. In step S311, the service cooperative processing program P5 executes the program P1.

Figure 7:
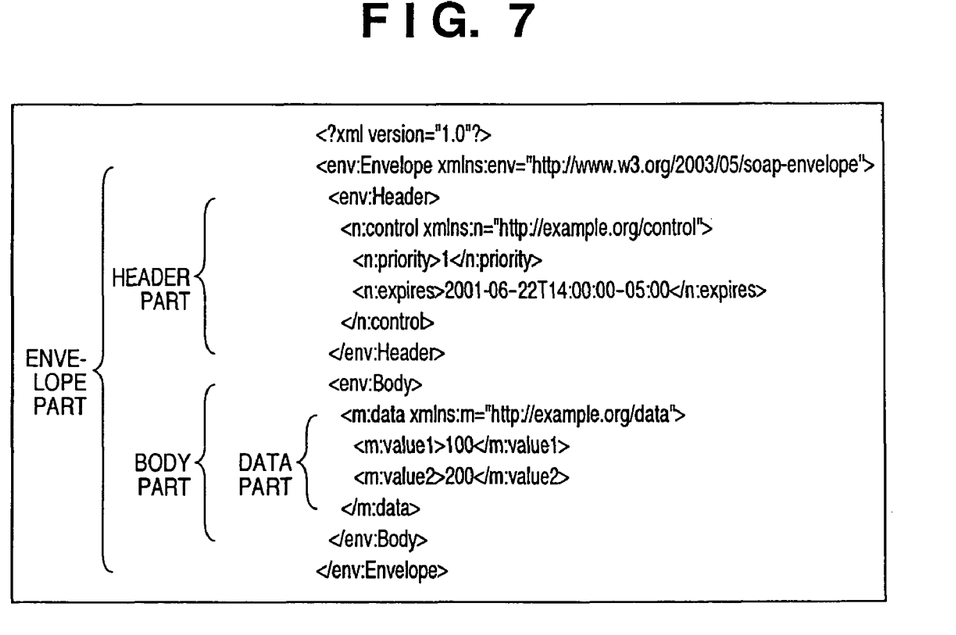
FIG. 7 is a view showing a detailed example of a message structure.

FIG. 7 shows an example of a message containing only data. This message uses SOAP by the XML technology and is processed by the conventional Web service technology. The SOAP message has a header part and a body part in an envelope part. Contents named value1 and value2 are stored in the body part as data.

Figure 8:
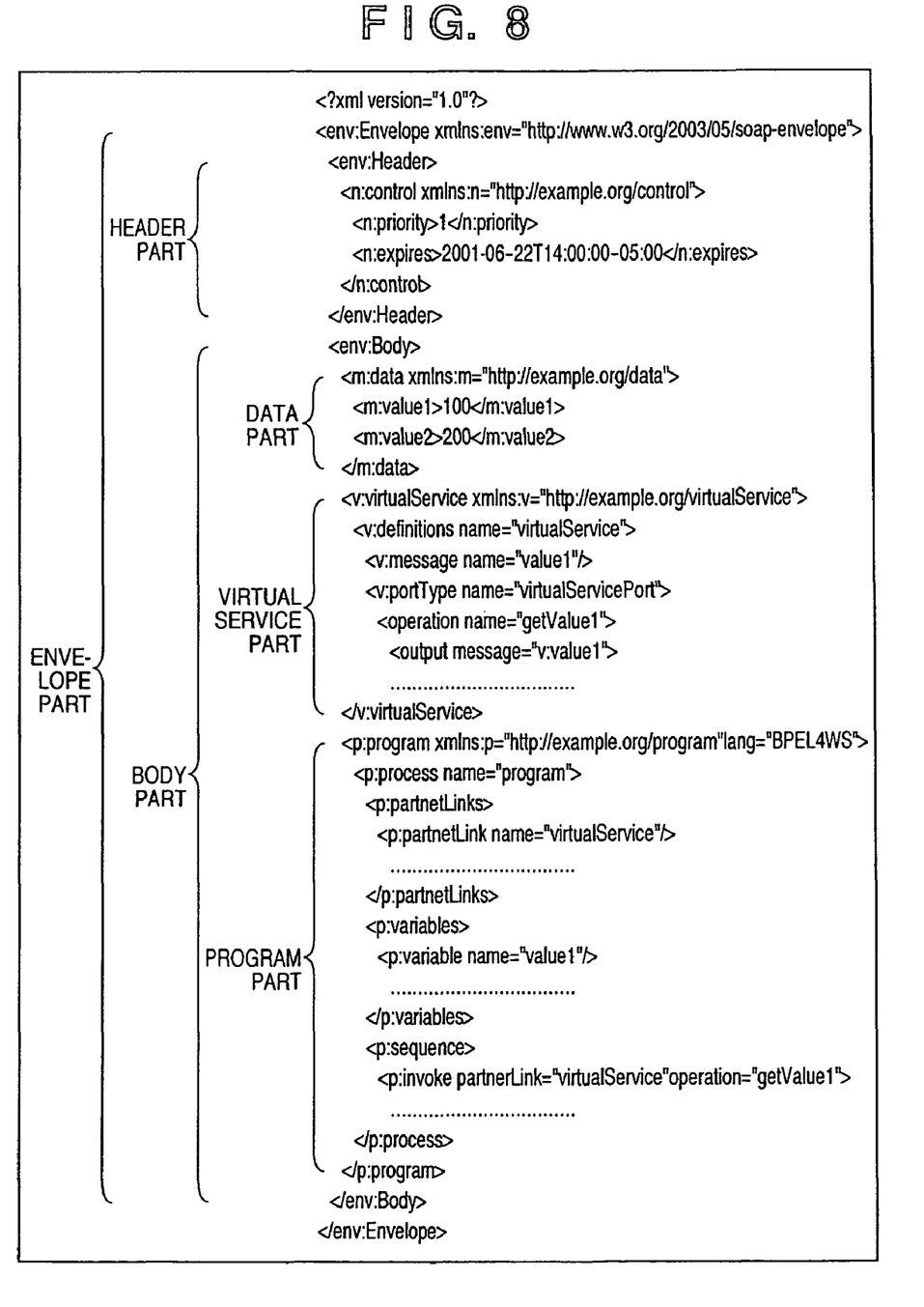
FIG. 8 is a view showing a detailed example of a message structure according to the embodiment of the present invention.

FIG. 8 shows an example of a message generated by this embodiment. This message stores not only data but also a program while maintaining compatibility with the conventional Web service technology. As in FIG. 7, the SOAP message has a header part and a body part in an envelope part. Contents named value1 and value2 are stored in the body part as data. A virtual service part and a program part are added. The virtual service part is a specification part indicating specifications to process the data part.

The actual sequence of processing the SOAP message in FIG. 8 will be described below. This example shows simple processing of receiving and summing two values and returning the sum.

The SOAP message to be transmitted corresponds to the SOAP message M1 generated by the SOAP processing program P3 that runs in an execution environment E1 on the client C1 in FIG. 2.

In step S301 of FIG. 4A, processing to be executed by the external processing system (server S1) is decided to be processing of summing two numbers. In step S302, the SOAP processing program P3 generates an envelope part containing an <env:Envelope> element, a header part containing an <env:Header> element, a body part containing an <env:Body> element, and the data part D1 containing an <m:data> element in FIG. 7, as in normal SOAP message generation processing. The data part D1 stores two values, 100 and 200 in <m:value1> and <m:value2> elements.

In step S303, the program part P1 and virtual service part R1 in FIG. 8 are added.

The program part P1 added in a <p:program> element includes contents to sum the two values. This program is described in BPEL4WS, i.e., a service cooperative description language expressed by XML. The target data are the contents of the <m:value1> and <m:value2> elements described in the data part D1 of the SOAP message. To access the information of these elements, reference to "virtualService" as a virtual service is embedded in a <p:partnetLink> element of the program part P1.

The virtual service part R1 is generated. The virtual service part R1 is indicated by a <v:virtualService> element and named, as the reference target, "VirtualService" by the name attribute in an internal <v:definitions> element. A message named value1 indicating the type of data to be returned by the access means in the virtual service is defined as a <v:message> element. Access means to the data <m:value1> and <m:value2> held by the data part D1, i.e., getValue1 and getValue2 are defined in a <v:portType> element. FIG. 8 does not illustrate getValue2. The virtual service part R1 is a specification part indicating specifications to process the data part D1.

Referring to FIG. 8, the data part, virtual service part (specification part), and program part are defined by tags named "data", "virtualService", and "program".

The SOAP message shown in FIG. 8 is thus created and transmitted by the NETIF 304 of the client C1 in step S304.

The SOAP processing program P2 in the server S1 shown in FIG. 2 receives the transmitted SOAP message. That is, the SOAP processing program P2 processes the message M1 received by the NETIF 304 of the server S1. The received SOAP message M1 is subjected to the processing from step S305 in FIG. 4B. In step S306, it is determined whether the body part of the message M1 contains the program part P1. The SOAP message in FIG. 8 contains the <v:virtualService> element and <p:program> element in the <env:Body> element. It is therefore determined that the message is a SOAP message containing the virtual service part R1 and program part P1.

Control shifts to the virtual service processing program P4 in FIG. 4. In step S308, information necessary for virtual service formation is acquired. In step S309, the specifications of the virtual service to be formed are decided on the basis of the contents of the <v:virtualService> element of the virtual service part R1 in the body part of the SOAP message M1 in FIG. 8. For example, the name of the virtual service is defined as "VirtualService" on the basis of the name attribute of the <v:definitions> element. Then, the virtual service processing program P4 in FIG. 2 starts providing the virtual service in accordance with the acquired specifications.

In step S310, the virtual service processing program P4 transmits, to the service cooperative processing program P5, the information of the thus formed virtual service and the information of the program part P1 stored in the SOAP message M1. In this case, the service cooperative processing program P5 can execute BPEL4WS as a Web service cooperative language. Hence, the service cooperative processing program P5 starts sequentially executing the processing described in the program part P1 in step S311. At this time, "VirtualService", i.e., a service defined by <p:partnetLink> in the processing program part P1 indicates the virtual service formed above. For example, when the service cooperative processing program P5 performs normal procedures to access a service by executing <p:invoke partnerLink="virtualService" operation="getValue1"> in the processing program part P1, the virtual service processing program P4 receives the request and returns 100 as an execution result from <m:value1>100</m:value1> described in the data part D1 of the SOAP message M1.

More specifically, in executing <p:invoke partnerLink="virtualService" operation="getValue1">, the service cooperative processing program P5 issues an inquiry to resolve the address of the service from the service name ("VirtualService"). If it is an inquiry about the name "VirtualService", the virtual service processing program P4 returns the address of the local host. The address of the local host is, e.g., 127.0.0.1 in IPv4. If the virtual service processing program P4 hosts (provides) a plurality of virtual services, a combination of an IP address and a virtual service identifier, i.e., a hypertext transfer protocol (HTTP) of 127.0.0.1/virtualService is returned. That is, a specification part indicating the specifications of processing executed by the instruction executed when executing the instruction <p:invoke partnerLink="virtualService" operation="getValue1"> contained in the program part of the received message M1 is decided (the address of the service is resolved from the service name ("VirtualService")). In this example, a specification part indicating the specifications of processing by the instruction <p:invoke partnerLink="virtualService" operation="getValue1"> executed by the virtual service part R1 in the message M1 is decided.

"VirtualService" is a specification part identifier to identify the specification part indicating the specifications of processing executed by the instruction, and "getValue1" is a specification identifier to identify specifications to process the data. These identifiers indicate the virtual service part R1 and the specifications to process the data defined in the virtual service part R1 in the message M1, respectively. In this case, "getValue1" indicates acquiring data with a data identifier "Value1" from the data D1.

Upon receiving this reply, the service cooperative processing program P5 requests the address of the local host to execute specific processing ("getValue1") in the service ("VirtualService"). The virtual service processing program P4 receives the request. If processing with a preposition "get" in its name (e.g., getValue1) is requested, the virtual service processing program P4 checks whether an element (data) with a name equivalent to the value (Value1) without "get" exists in the data D1 of the message M1. If the element exists, the virtual service processing program P4 returns the value (100) to the service cooperative processing program P5. If the virtual service part R1 (specification part) in the received message represents the specifications of processing executed by the instruction executed when executing the instruction <p:invoke partnerLink="virtualService" operation="getValue1"> contained in the program part P1 of the received message M1, the data part D1 is processed by the specifications indicated by the virtual service part R1. Since the service specifications indicate "getValue1", the value (100) of data with a data identifier "Value1" is acquired from the data part D1.

After the data stored in the data part D1 existing in the SOAP message M1 is processed, the result is returned in step S312. The processing of the SOAP message aims at receiving and summing two values. Because 100+200, 300 is returned.

In the above embodiment, BPEL4WS serving as a service cooperative description language is used as the computer language to describe the program in the program part stored in the message. Any other computer language such as WSCI aiming at service cooperative description may be used if the computer language employs XML, and its manipulation target is a Web service.

The above embodiment has been described in association with only the relationship between a single client and a single server. However, the embodiment may be applied to the relationship between a plurality of clients and a plurality of servers.

The present invention can be applied to an apparatus including a plurality of devices (e.g., AV devices, household electric appliances, computer devices, and interface devices) or an apparatus including a single device.

The embodiment has been described above in detail. The present invention can also take a form of, e.g., a system, apparatus, method, program, or storage medium (recording medium). More specifically, the present invention can be applied to a system including a plurality of equipments or an apparatus including a single equipment.

The present invention is also achieved even by supplying a software program (in the embodiment, a program corresponding to the illustrated flowcharts) which implements the functions of the above-described embodiment to the system or apparatus directly or from a remote site and causing the computer of the system or apparatus to read out and execute the supplied program codes.

Hence, the program code itself, which is installed in a computer to implement the functional processing of the present invention by the computer, also implements the present invention. That is, the present invention also incorporates the computer program itself that implements the functional processing of the present invention.

In this case, the program can take any form such as an object code, a program to be executed by an interpreter, or script data to be supplied to the OS as long as the functions of the program can be obtained.

As a recording medium to supply the program, for example, a Floppy® disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be linked to a homepage on the Internet by using a browser in the client computer, and the computer program itself of the present invention or a compressed file containing an automatic install function may be downloaded from the homepage to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program by using the key information, and install the program in the computer.

The functions of the above-described embodiment are implemented not only when the readout program is executed by the computer but also when, e.g., the OS running on the computer performs part or all of actual processing on the basis of the instructions of the program.

The functions of the above-described embodiment are also implemented when the program read out from the recording medium is written in the memory of a function expansion board inserted into the computer or a function expansion unit linked to the computer, and the CPU of the function expansion board or function expansion unit performs part or all of actual processing on the basis of the instructions of the program.

The present invention is not limited to the above-described embodiment, and various changes and modifications can be made. The technical scope of the present invention is determined on the basis of the following claims.

CLAIM OF PRIORITY

This application claims the benefit of Japanese Patent Application No. 2004-074536, filed Mar. 16, 2004, which is hereby incorporated by reference herein in its entirety.

The invention claimed is:

1. A data processing method comprising:
using a processor to perform:
receiving a SOAP message that is described in an XML format and includes a data part, a specification part indicating specifications of a service to process the data part, and a program part, wherein the specification part is described in the XML format and is used for describing a Web service;
performing instructions comprised in the program part which is described in the XML format using Business Process Execution Language for Web Services (BPEL4WS); and
performing a specific process on data included in the data part, wherein the specific process is performed by the service, specifications of the service being indicated in the specification part, when an instruction including a reference to the service is included in the instructions comprised in the program part of the received message.

2. A method according to claim 1, wherein the service is provided at a local host.

3. A method according to claim 1, further comprising a step of generating the service according to the specification part, and the specific process is performed by the generated service.

4. A data processing method comprising:
using a processor to perform:
receiving a SOAP message that is described in an XML format and includes a data part, a specification part indicating specifications of a service to process the data part, and a program part comprising instructions, wherein the specification part is described in the XML format and is used for describing a Web service;
performing the instructions comprised in the program part which is described in the XML format using Business Process Execution Language for Web Services (BPEL4WS); and
processing the data part by the service referred by one of the instructions executed when executing the instructions comprised in the program part.

5. A method according to claim 4, wherein the service is provided at a local host.

6. A method according to claim 4, further comprising a step of generating the service according to the specification part, and the specific process is performed by the generated service.

7. A data processing method comprising:
using a processor to perform:
receiving a SOAP message that is described in an XML format and includes a data part comprising data and a data identifier to identify the data, a specification part comprising specifications of a service for acquiring data with the data identifier, and a program part comprising instructions, wherein the specification part is described in the XML format and is used for describing a Web service;
performing the instructions comprised in the program part which is described in the XML format using Business Process Execution Language for Web Services (BPEL4WS);
acquiring the data comprised in the data part and identified by the data identifier from the service referred by one of the instructions comprised in the program part; and
processing the data acquired in said acquiring step in accordance with the instructions comprised in the program part.

8. A method according to claim 7, wherein the service is provided at a local host.

9. A method according to claim 7, further comprising a step of generating the service according to the specification part, and the specific process is performed by the generated service.

10. A non-transitory computer-readable medium on which is stored a data processing program which causes a computer to execute a data processing method, the method comprising:
using a processor to perform:
receiving a SOAP message that is described in an XML format and includes a data part, a specification part indicating specifications of a service to process the data part, and a program part, wherein the specification part is described in the XML format and is used for describing a Web service;
performing instructions comprised in the program part which is described in the XML format using Business Process Execution Language for Web Services (BPEL4WS); and
performing a specific process on data included in the data part, wherein the specific process is performed by the service, specifications of the service being indicated in the specification part, when an instruction including a reference to the service is included in the instructions comprised in the program part of the received message.

11. A data processing device comprising:
a processor coupled to memory;
reception means for receiving a SOAP message that is described in an XML format and includes a data part, a specification part indicating specifications of a service to process the data part, and a program part, wherein the specification part is described in the XML format and is used for describing a Web service; and processing means for performing instructions comprised in the program part which is described in the XML format using Business Process Execution Language for Web Services (BPEL4WS), and for performing a specific process on data included in the data part, wherein the specific process is performed by the service specifications of the service indicated in the specification part, when an instruction including a reference to the service is included in the instructions comprised in the program part of the received message.

12. A device according to claim 11, wherein the service is provided at a local host.

13. A device according to claim 11, wherein said processing means generates the service according to the specification part, and the specific process is performed by the generated service.

14. A non-transitory computer-readable medium on which is stored a SOAP message described in an XML format, the SOAP message comprising:
   a data part defined by a first tag;
   a specification part defined by a second tag and which is described in the XML format and is used for describing a Web service; and
   a program part which is described in the XML format using Business Process Execution Language for Web Services (BPEL4WS) and defined by a third tag,
   wherein the specification part indicates specifications of a service to process the data part, and the program part comprises a first instruction to perform the service, the specifications of the service being indicated in the specification part, and a second instruction to process a result of the specific process.

15. A non-transitory computer-readable medium according to claim 14, wherein the service is provided at a local host.

16. A non-transitory computer-readable medium on which is stored SOAP message structure described in an XML format, the SOAP message structure comprising:
   a data part comprising data and a data identifier to identify the data;
   a specification part which is described in the XML format and is used for describing a Web service and comprises data processing specifications indicating acquisition of data with the data identifier; and
   a program part which is described in the XML format using Business Process Execution Language for Web Services (BPEL4WS) and comprises first and second instructions,
   wherein the first instruction comprised in the program part includes an instruction to acquire the data identified by the data identifier from a service, specifications of the service being indicated in the specification part, according to an identifier to identify the service to acquire the data identified by the data identifier, and wherein the second instruction comprised in the program part includes an instruction to process the acquired data.

17. A non-transitory computer-readable medium according to claim 16, wherein the service is provided at a local host.

* * * * *